Feb. 17, 1948.  W. E. MALCOLM  2,436,218
PROCESS FOR CONCENTRATING BY FREEZING LIQUID FRUIT JUICE
Filed Sept. 12, 1944  2 Sheets-Sheet 1

Inventor
Wade E. Malcolm,
By C. E. Weare
Attorney

Inventor
Wade E. Malcolm,
By
Attorney

Patented Feb. 17, 1948

2,436,218

UNITED STATES PATENT OFFICE 2,436,218

PROCESS FOR CONCENTRATING BY FREEZING LIQUID FRUIT JUICE

Wade E. Malcolm, Orlando, Fla.

Application September 12, 1944, Serial No. 553,748

1 Claim. (Cl. 99—205)

This invention relates to the concentration of liquid food substances, the invention being in the nature of a process and apparatus for concentrating liquid food substances by freezing.

Liquid food substances contain a very large percentage of water. Practically all of such substances also contain very valuable chemicals such as vitamines and flavoring complexes. Generally the vitamines are destroyed by subjecting the substances to heat and it also frequently happens that the flavor is destroyed or changed by too much heat. It has been proposed to freeze out the watery content of such substances to a great extent thereby leaving a concentrate. However, experience has shown that if such substances are exposed to freezing and the fluid is separated from the frozen matter much of the nutritive value of the substance would pass off with the frozen matter if such freezing is done in a single stage and carried out at a sufficiently low temperature and for a sufficient time to leave the remaining liquid in a sufficiently concentrated state.

The proposed object of the present invention is to provide a normal means of concentrating liquid food substances by freezing wherein the freezing is carried out in successive stages or steps in such manner that the frozen portions removed at each stage will contain extremely little of the food values of such substances.

The second important object of the invention is to provide a suitable form of apparatus whereby such stage freezing may be carried out.

A third important object of the invention is to provide a method whereby the substance to be concentrated may be chilled and deaerated prior to its freezing.

With the above and other objects in view the invention consists in general of certain novel details of construction and combinations of parts hereinafter fully described, illustrated in the accompanying drawings, and particularly claimed.

In the accompanying drawings, like characters of reference indicate like parts in the several views, and:

Figure 1:
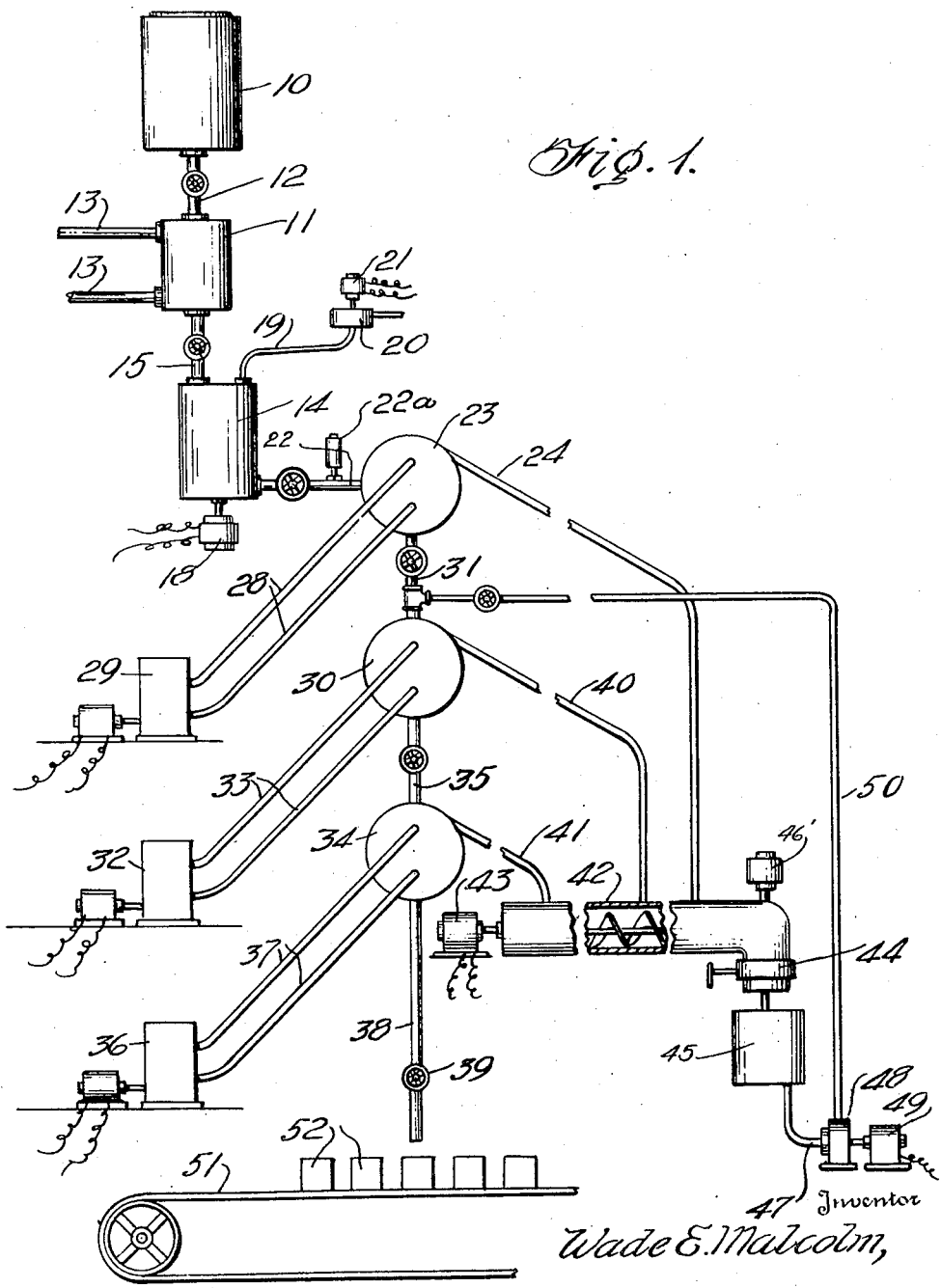
Figure 1 is a diagrammatic elevation of an apparatus suitable for carrying out the invention.
Figure 2:
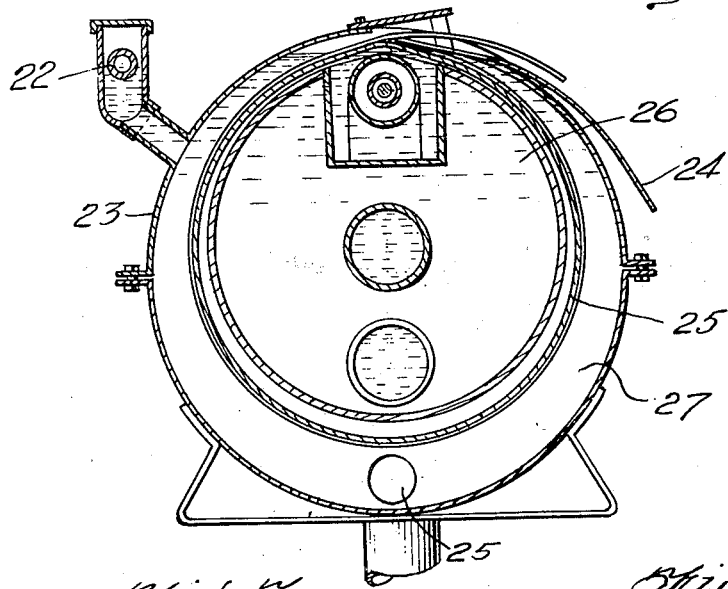
Figure 2 is a diagrammatic cross section showing one type of freezer suitable for use in this invention.
Figure 3:
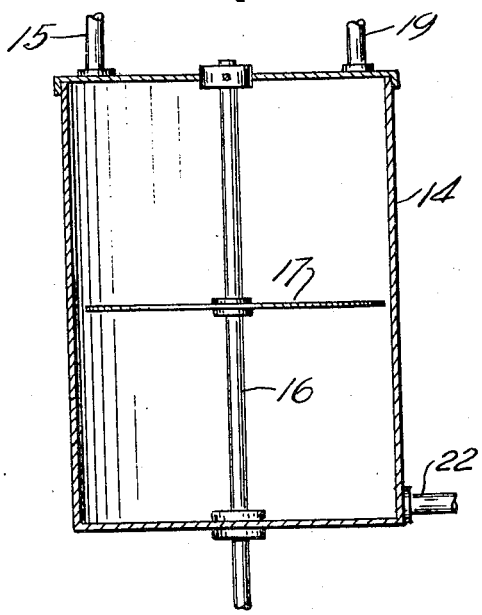
Figure 3 is a sectional view showing a type of deaerator suitable for use herewith.
Figure 4:
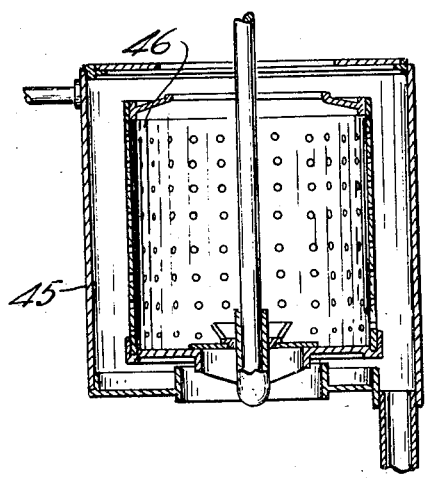
Figure 4 is a cross-section showing a suitable type of centrifuge.

In carrying out the invention the construction herein shown is indicated as operating substantially by gravity although pumps are used in certain places. However any suitable arrangement of the various elements of the apparatus may be made and where other arrangements are made pumps may be necessary to overcome the effect of gravity in certain instances. However, as here shown the liquid food substance, expressed by any suitable means such as pressure apparatus, is emptied into a tank, 10, which communicates at its bottom with a heat exchanger or pre-cooler 11 through a valved pipe 12. The pre-cooler is kept cool by cooling fluid entering and leaving through suitable pipes such as shown at 13. In turn the pre-cooler communicates with a suitable deaerating device 14 by a valved pipe 15. One type of such a deaerator is shown in Figure 3 wherein there is disclosed a shaft 16 carrying a disc 17, the shaft being rapidly revolved by motor 18. Thus when the fluid enters through the pipe 15 it strikes the disc 17 and is scattered against the walls of the vessel 14. A pipe 19 leads from the top of the deaerator to a vacuum pump 20 driven by motor 21. Thus the air is drawn off leaving the air-free fluid to drop to the bottom of the deaerator from whence it is drawn off through a valve pipe 22. This pipe 22 leads to a freezer 23 which is here illustrated as of the type shown in Figure 5 of the patent to Field #2,005,736 and Figure 2 of the patent to Field #2,078,938. The pipe 22 has a vacuum breaker 22a connected thereto. It is not therefore deemed necessary to enter into any further description of this device than to say that from the upper part of the freezer a suitable chute 24 leads off to carry away from the frozen flakes which accumulate on the exterior of the surface of the cylinder 25 containing the freezing mixture 26, the mixture to be frozen lying between the cylinder 25 and the exterior cylinder in the space 27. This freezing mixture 26 may be supplied, as shown in Field by a self-contained freezing apparatus or may be supplied through pipes 28 from exterior freezing apparatus 29. The freezer 23 communicates with a freezer 30 through a valved pipe 31, the freezer 30 being of the same construction as 23 and having, as diagrammatically shown, a freezing unit 32 communicating through pipe 33. Similarly the freezer 30 communicates with a freezer 34 through a valved pipe 35 and the freezer 34 has a freezing unit 36 connected thereto by pipes 37. Leading from the freezer 34 is a delivery pipe 38 having a valve 39. The freezer 30 is provided with a chute 40 and the freezer 34 is provided with a chute 41 for the removal of the frozen portions of the substance passing through the freezer. The chutes 24, 40 and 41 preferably communicate with a screw conveyor 42, driven by a motor 43 and this conveyor opens through a valve 44 to a centrifuge 45 having a removable basket 46 and a drain 47 which leads to a pump 48 driven by motor 49 and delivering to a valved pipe 50 here shown as leading to the pipe 31 although it is to be understood that the pipe 50 may be connected if desired to the pipe 22, the pipe 35 or the pipe 39. Preferably however the pipe 50 will be connected in such manner that the fluid flowing there will pass through at least one of the freezers.

Moreover while there have been three freezers shown in the present instances it is to be understood that there may be as many freezers as found desirable. A conveyor 51 may be used for conveying cans or other receptacles 52 beneath a delivery pipe 38 so that these cans may be filled with the final concentrate and carried away for sealing.

In the operation of the device the freezers 23, 30 and 34 are maintained in successively colder freezing condition. As an example, the temperature of the freezer 23 may be maintained at approximately 18° F., the freezer 30 at approximately 10° F. and the freezer 34 at approximately 0° F. In the first freezer there will be frozen out a certain portion of the water and of course the fluid will be concentrated; that is there will be a greater amount of the fluid solids after this first freezing than before the fluid went into the freezer. Similarly each of the freezers 30 and 34 will further concentrate fluid. The flake ice from the freezer 23, 30 and 34 is carried to the conveyor 42 which feeds it to the centrifuge 45. In centrifuge the more dense portions are thrown out against the wall of the device, pass down through the pipe 47 and are pumped back to pass again through one or more of the freezers.

As a specific example of the concentration, fruit juice may enter the freezer 23 containing 14.5 percent of solids. With the temperature and concentration noted the fruit juice may enter the freezer 30 at about 24 percent solids and with the temperature and concentration last noted the fruit juice will enter the freezer 34 containing about 44 percent solids. By this means any liquid food supplies may be highly concentrated with no loss of vitamines or flavors.

What is claimed is:

A method of concentrating fruit juice which consists in pre-cooling the substance, de-aerating the substance, passing the pre-cooled and de-aerated substance through successive freezing stations at successively lower temperatures, removing the frozen portion of the substance from each station, separating the denser and lighter parts of the frozen portions removed from the successive freezing stations, and repassing the denser parts through some of the freezing stations and finally subjecting the resulting product to centrifuging action.

WADE E. MALCOLM.

REFERENCES CITED

The following references are of record in the file of this patent:

UNITED STATES PATENTS

| Number | Name | Date |
|---|---|---|
| 973,290 | Monti | Oct. 18, 1910 |
| 1,359,911 | Oman | Nov. 23, 1920 |
| 1,362,868 | Johnson | Dec. 21, 1920 |
| 1,379,470 | Monti | May 24, 1921 |
| 1,576,137 | Johnson | Mar. 6, 1926 |
| 1,896,529 | Tressler | Feb. 7, 1933 |
| 1,980,695 | Polk | Nov. 13, 1934 |
| 2,104,710 | Blanck | Jan. 4, 1938 |
| 2,151,644 | Stephens | Mar. 21, 1939 |
| 2,225,627 | Flosdorf | Dec. 24, 1940 |
| 2,354,633 | Bedford | July 25, 1944 |
| 2,389,732 | Kellogg | Nov. 27, 1945 |

FOREIGN PATENTS

| Number | Country | Date |
|---|---|---|
| 16,978 | Great Britain | 1898 |